(12) United States Patent
Diesler et al.

(10) Patent No.: US 7,264,438 B2
(45) Date of Patent: Sep. 4, 2007

(54) METHOD FOR COOLING A TURBO MACHINE AND TURBO MACHINE

(75) Inventors: Michael Diesler, Hattingen (DE); Martin Grosse Düweler, Muelheim a.d. Ruhr (DE); Uwe Hoffstadt, Muelheim a.d. Ruhr (DE); Oliver Myschi, Muelheim A.D. Ruhr (DE); Uwe Zander, Mülheim (DE)

(73) Assignee: Siemens Aktiengesellschaft, Munich (DE)

( * ) Notice: Subject to any disclaimer, the term of this patent is extended or adjusted under 35 U.S.C. 154(b) by 138 days.

(21) Appl. No.: 10/791,088

(22) Filed: Mar. 2, 2004

(65) Prior Publication Data
US 2004/0175264 A1    Sep. 9, 2004

(30) Foreign Application Priority Data
Mar. 6, 2003   (EP)   ................... 03005070

(51) Int. Cl.
*F01D 25/12* (2006.01)
(52) U.S. Cl. ............... 415/1; 415/116; 415/177
(58) Field of Classification Search ......... 415/177
See application file for complete search history.

(56) References Cited

U.S. PATENT DOCUMENTS 2,552,239 A  *  5/1951  Warren .................. 415/116

FOREIGN PATENT DOCUMENTS

| EP | 1 152 125 | A1 |   | 11/2001 |
|----|-----------|----|---|---------|
| EP | 1 154 123 | A1 |   | 11/2001 |
| EP | 1152125   | A1 | * | 11/2001 |
| EP | 1 184 541 | A1 |   | 3/2002  |

* cited by examiner

Primary Examiner—Richard A. Edgar

(57) ABSTRACT

The invention relates to a method and a device for cooling thermally stressed regions in a turbo machine which has a live-steam feed line (9), an inflow region (17), a housing (2) and an exhaust-steam region (7), a flow medium flowing through the turbo machine (1) and leaving in the exhaust-steam region (7) during operation, part of the flow medium from the live-steam feed line (9) being passed to the exhaust-steam region (7) and cooled by means of a heat exchanger (8) before entry into the turbo machine (1) and entering the turbo machine (1) via the inflow region (17), thermally stressed regions that are located in the inflow region (17) being cooled by the f low medium that has been cooled in this way.

10 Claims, 2 Drawing Sheets

METHOD FOR COOLING A TURBO MACHINE AND TURBO MACHINE

CROSS REFERENCE TO RELATED APPLICATION

This application claims priority of the European application No. 03005070.2 EP filed Mar. 6, 2003 under the European Patent Convention and which is incorporated by reference herein in its entirety.

FIELD OF INVENTION

The invention relates to a method for cooling thermally stressed regions in a turbo machine which has a live-steam feed line, an inflow region, a housing and an exhaust-steam region, a flow medium flowing through the turbo machine and leaving in the exhaust-steam region during operation, and also relates to a turbo machine for carrying out the method.

BACKGROUND OF INVENTION

In the construction of turbo machines, especially in the construction of steam turbines, steam at temperatures lying below the temperature of live steam under live steam pressure is required for cooling regions that are subjected to high thermal stress. The live steam pressure is the pressure of a flow medium entering the inflow region of a turbo machine. The live steam temperature is correspondingly the temperature that a flow medium has at the inlet into a turbo machine.

In today's turbo machines, cooling steam with the characteristic variables described above of temperature and pressure is not produced by the machine itself.

The cooling steam required is generally supplied to the turbo machine through a separate line. In the case of turbo machines with multi-stage superheater stages, the cooling steam is usually removed from an associated boiler upstream of the last superheater stage and passed to the turbo machine in a separate line. The disadvantage of this solution is that a separate line causes additional costs. In addition, a direct dependence on the boiler arises to the extent that the dimensioning of the cooling steam system depends on the boiler parameters and that failure of the cooling steam supply likewise leads to failure of the cooling.

SUMMARY OF INVENTION

The object of the invention is to provide a method with which the provision of cooling steam is less susceptible to problems. Furthermore, a turbo machine for which the aforementioned method is used is to be provided.

The object directed at the method is achieved in that, for cooling thermally highly stressed regions in a turbo machine which has a live-steam feed line, an inflow region, a housing and an exhaust-steam region, a flow medium flowing through the turbo machine and leaving in the exhaust-steam region during operation, part of the flow medium from the live-steam feed line is cooled in a heat exchanger before entry into the turbo machine and enters the turbo machine via the inflow region, thermally highly stressed components that are located in the inflow region being cooled by the flow medium that has been cooled in this way. By this method it is possible to provide cooling steam without using a separate external line for the supply of cooling steam. The cooling steam is virtually generated by the turbo machine itself.

In an advantageous development, the heat exchanger is located in the exhaust-steam region of the turbo machine. This measure achieves the effect that an external cooling source does not have to be used as the cooling source. This has the effect of creating as it were an autonomous system.

In an advantageous development of the method, a shut-off valve is arranged in the live-steam feed line and the part of the flow medium that passes directly to the exhaust-steam region is branched off downstream of the shut-off valve. This creates the possibility of quickly interrupting the steam supply to the turbo machine by actuating the quick-closure valve in the event of a problem occurring.

In an advantageous development of the method, the method is used for turbo machines which have a heat exchanger which is distinguished by the fact that the part of the flow medium that flows through the heat exchanger is cooled by at least 10° C. below the temperature of the live steam. In particular, the heat exchanger may be distinguished by the fact that the part of the flow medium that flows through the heat exchanger is cooled by at least 20° C. below the temperature of the live steam.

In an advantageous development of the method, the method is used for a turbo machine which has a thrust-compensating piston, the cooling steam generated in the method being passed to the thermally stressed thrust-compensating piston. This creates the possibility of cooling a thermally stressed component, such as the thrust-compensating piston, autonomously without a separate cooling steam line.

The object directed at the device is achieved by a turbo machine which has a live-steam feed line through which a flow medium can flow and which leads to a live-steam inflow region, the turbo machine having an outflow region, the live-steam feed line having a branch with which part of the flow medium is passed via a line to a heat exchanger, and the turbo machine having a feed line downstream of the heat exchanger into an inflow region. By this novel arrangement of the cooling-steam feed line it is possible to provide cooling steam without laying a separate external line. The cooling steam is virtually generated by the turbo machine itself.

In an advantageous development, the heat exchanger is arranged in the exhaust-steam region of the turbo machine. This measure achieves the effect that an external cooling source does not have to be used as the cooling source. This has the effect of creating as it were an autonomous system.

In an advantageous development of the device, a shut-off valve is located in the live-steam feed line, the branching of the live-steam feed line to the heat exchanger taking place just downstream of the shut-off valve. This achieves the effect that the live-steam feed line, and consequently also the cooling feed line, can be interrupted in the event of a problem arising.

In a further advantageous development of the device, the generated cooling steam is passed directly to the thrust-compensating piston of the steam turbine. This has the effect of specifically cooling a region which is thermally stressed in a turbo machine.

BRIEF DESCRIPTION OF THE DRAWINGS

An exemplary embodiment of the invention is explained in more detail on the basis of a drawing.

In the figures of the drawings specifically.

The same reference numerals are used throughout the following text for parts that are the same or have the same function.

DETAILED DESCRIPTION OF INVENTION

Figure 1:
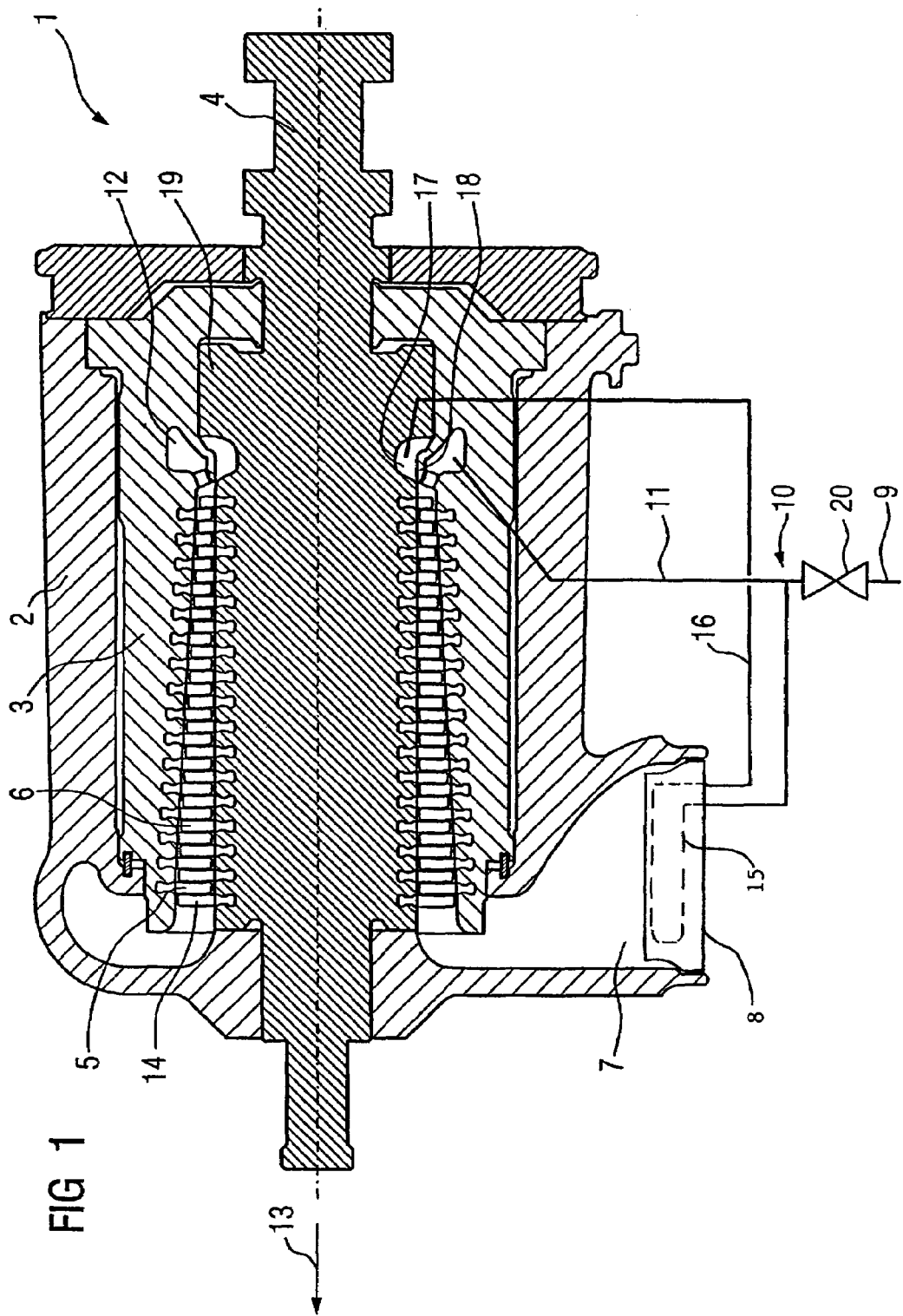
FIG. 1 shows the cross section of a turbo machine.

In FIG. 1, a turbo machine 1 is represented. The turbo machine 1 has a housing 2. An inner housing 3 is arranged in such a way that a shaft 4 is rotatable within the inner housing 3. The inner housing 3 has guiding blades 5. The shaft 4 has moving blades 6. A heat exchanger 8 is arranged in the exhaust-steam region 7. The heat exchanger does not have to be arranged in the exhaust-steam region 7 of the turbo machine 1.

The live steam is passed to the turbo machine 1 from a boiler (not represented) via the live-steam feed line 9. At the branch 10, part of the live steam is passed to the heat exchanger 8. The temperature of the live steam upstream of this branch 10 may be around 565° C. and the pressure around 250 bar. The remaining part of the live steam, i.e. the part that is not passed to the heat exchanger, passes via the line 11 into the turbo machine 1. The live steam thereby passes into the live-steam inflow region 12 and, from there, the flow medium flows through the guiding blades and moving blades 5, 6 along the axial direction 13. After the final row of blades 14, which comprises a row of guiding blades and moving blades 5 and 6, the cooled and expanded live steam passes into the exhaust-steam region 7. The temperature may then be 330° C. The pressure may be around 55 bar.

The heat exchanger 8 is designed in such a way that the flow medium leaving downstream of the heat exchanger 8 is cooled by at least 10° C., in particular by at least 20° C., with respect to the flow medium entering the heat exchanger upstream of it.

The live steam cooled in this way passes via the discharge line 16 into the inflow region 17 of the turbo machine 1. The inflow region 17 is separated from the live-steam inflow region 12 by means of a guiding blade ring 18 in such a way that the cooled live steam that comes from the discharge line 16 passes into the inflow region 17. From there, the cooled live steam passes to the thermally stressed thrust-compensating piston 19 or to other thermally stressed regions. The thermally stressed regions of the shaft 4 in the inflow region 17 are cooled by the cooled live steam.

Figure 2:
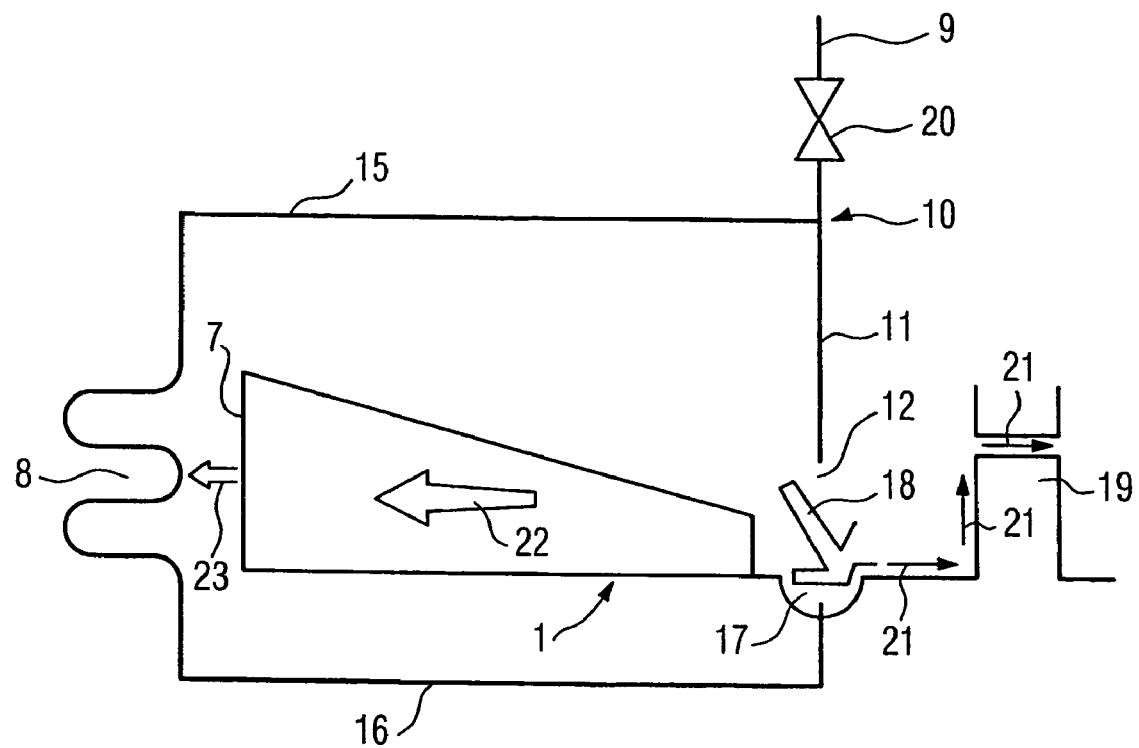
FIG. 2 shows a basic diagram of the cooling steam generation.

In FIG. 2, a basic diagram of the cooling arrangement can be seen. Live steam passes via a live-steam feed line 9 to the turbo machine 1. The live-steam feed line 9 has a shut-off valve 20. The shut-off valve 20 is fitted upstream of a branch 10. The branch 10 leads to a branching of live steam via a feed line 15 to the heat exchanger 8. The branched-off live steam is cooled in the heat exchanger 8 and passes via the discharge line 16 into the inflow region 17. The direction of flow of the cooling steam 21 is represented by the arrows 21. The cooling steam is passed around the thrust-compensating piston 19 and in this way cools this thermally stressed region. The inflow region 17 is separated from the live-steam inflow region 12 by means of a guiding blade ring 18.

The part of the live steam that passes via the live-steam feed line 9 and the line 11 to the turbo machine 1 flows over guiding blades and moving blades (not represented in FIG. 2) in the direction of the arrow 22 through the turbo machine 1 and leaves the turbo machine 1 in the exhaust-steam region 7. The guiding blade ring 18 is fitted in such a way that the cooling steam can be introduced into the turbo machine 1. All that is required for this purpose is that the pressure loss in the heat exchanger 8 that is used is lower than the pressure reduction over this guiding blade ring 18, in order to obtain a driving pressure differential. The heat exchanger 8 located in the exhaust-steam flow 23 of the turbo machine 1 cools down the live steam coming via the feed line 15 and gives off the excess heat to the exhaust steam, it being possible if appropriate for this excess heat to be saved in a downstream reheat cycle that is not represented. As a result, no additional losses occur.

The live steam required for the cooling can be removed downstream of the shut-off valve 20. This has the effect that the entire system is self-regulating, i.e. no additional shut-off or control devices are required. This has the effect that this method for cooling is independent of a boiler (not represented) and other components. In other words, the cooling steam required is generated by the turbine itself and in this way makes it independent of external components. This variant is simple and inexpensive, since the generation of the cooling steam takes place with a heat exchanger 8 installed in the feed line 15.

The invention claimed is:

1. A method for cooling thermally stressed regions in a turbo machine, comprising:
   flowing a flow medium through the turbo machine to an exhaust-steam region defined by a housing of the turbo machine itself during operation of the turbo machine;
   flowing a portion of the flow medium from a live-steam feed line to a heat exchanger disposed in the exhaust-steam region;
   cooling the portion of the flow medium in the heat exchanger;
   flowing the cooled portion of the flow medium into an inflow region of the turbo machine; and
   cooling thermally stressed regions that are located in the inflow region autonomously with only the portion of the flow medium from the live-steam feed line that has been cooled by the heat exchanger.

2. The method as claimed in claim 1, wherein the portion of the flow medium that enters the heat exchanger is removed downstream of a shut-off valve located in the live-steam feed line.

3. The method as claimed in claim 2, wherein the temperature of the portion of the flow medium cooled in the heat exchanger is at least 10° C. below the temperature of the live steam.

4. The method as claimed in claim 2, wherein the temperature of the portion of the flow medium cooled in the heat exchanger is at least 20° C. below the temperature of the live steam.

5. The method as claimed in claim 1, wherein the portion of the flow medium cooled by the heat exchanger is passed to a thrust-compensating piston.

6. An autonomously cooled turbo machine, comprising:
   a live-steam inflow region of the turbo machine in fluid communication with a live-steam feed line through which a flow medium flows, the live-steam feed line having a branch with which part of the flow medium is passed via a line to a heat exchanger within an exhaust region of the turbo machine defined by a housing of the turbo machine; and
   a discharge line arranged downstream of the heat exchanger leading into an inflow region of the turbo machine for delivering the part of the flow medium having been cooled in the heat exchanger for cooling a thermally stressed region of the turbo machine without using a separate external line for supply of cooling steam from a source other than the live-steam feed line.

7. The turbo machine as claimed in claim 6, wherein the live-steam feed line has a shut-off valve located upstream of the branch.

8. A turbo machine having autonomously cooled internal components, comprising:
- a live-feed flow line that flows a medium through a turbo machine and exits into an exhaust region defined by a housing of the turbo machine;
- a branch line extending from the live-feed line and adapted to pass a portion of the flow medium to a heat exchanger disposed in the exhaust region of the turbo machine; and
- a feed line arranged downstream of the heat exchanger leading into an inflow region of the turbo machine to provide cooled steam to a stressed region of the turbo machine.

9. The turbo machine as claimed in claim 8, wherein the live-steam feed line has a shutoff valve located upstream of the branch.

10. The turbo machine as claimed in claim 8, wherein the feed line downstream of the heat exchanger supplies flow to a thrust-compensating piston.

* * * * *